(12) United States Patent
Nefischer

(10) Patent No.: US 8,082,732 B2
(45) Date of Patent: Dec. 27, 2011

(54) DEVICE FOR ADMIXING A REDUCING AGENT INTO AN EXHAUST GAS FLOW OF AN INTERNAL COMBUSTION ENGINE

(75) Inventor: Peter Nefischer, Perg Oesterreich (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 655 days.

(21) Appl. No.: 11/954,102

(22) Filed: Dec. 11, 2007

(65) Prior Publication Data

US 2008/0134671 A1   Jun. 12, 2008

(30) Foreign Application Priority Data

Dec. 12, 2006 (DE) .......................... 10 2006 058 402

(51) Int. Cl.
*F01N 3/10* (2006.01)
(52) U.S. Cl. ................ 60/300; 60/286; 60/295; 60/303; 60/324
(58) Field of Classification Search ............... 60/274, 60/286, 295, 300, 301, 303, 324
See application file for complete search history.

(56) References Cited

U.S. PATENT DOCUMENTS

| | | | |
|---|---|---|---|
| 6,361,754 B1 * | 3/2002 | Peter-Hoblyn et al. | 423/213.2 |
| 6,516,610 B2 * | 2/2003 | Hodgson | 60/286 |
| 6,601,385 B2 * | 8/2003 | Verdegan et al. | 60/286 |
| 6,969,492 B1 | 11/2005 | Goerigk et al. | |
| 7,065,958 B2 * | 6/2006 | Funk et al. | 60/286 |
| 7,328,572 B2 * | 2/2008 | McKinley et al. | 60/286 |
| 7,509,799 B2 * | 3/2009 | Amou et al. | 60/286 |
| 7,581,387 B2 * | 9/2009 | Bui et al. | 60/286 |
| 2003/0070424 A1 | 4/2003 | Verdegan et al. | |
| 2006/0016176 A1 | 1/2006 | Hilden et al. | |
| 2007/0036694 A1 * | 2/2007 | Nishioka et al. | 422/168 |

FOREIGN PATENT DOCUMENTS

| | | |
|---|---|---|
| DE | 40 38 054 A1 | 6/1992 |
| EP | 1 054 139 A1 | 11/2000 |
| EP | 1 712 756 A1 | 10/2006 |
| JP | 9-96212 A | 4/1997 |
| JP | 2006-17043 A | 1/2006 |

OTHER PUBLICATIONS

European Search Report dated Jan. 22, 2008 with an English translation of the pertinent portions (Four (4) pages).

* cited by examiner

*Primary Examiner* — Binh Q Tran
(74) *Attorney, Agent, or Firm* — Crowell & Moring LLP

(57) ABSTRACT

A device is provided for admixing a reducing agent into an exhaust gas flow of an internal combustion engine having an exhaust system and a dosing device for feeding the reducing agent into the exhaust system. At least one heating rib, heatable by the exhaust gas and arranged downstream from the dosing device in the exhaust system is oriented largely in a flow direction of the exhaust gas. The dosing device is situated in or on a hollow body arranged on the exhaust system, an internal volume of which is connected to the exhaust system to conduct exhaust gas. An extremely low-flow device for admixing a reducing agent into an exhaust gas flow of an internal combustion engine is achieved by this design.

10 Claims, 2 Drawing Sheets

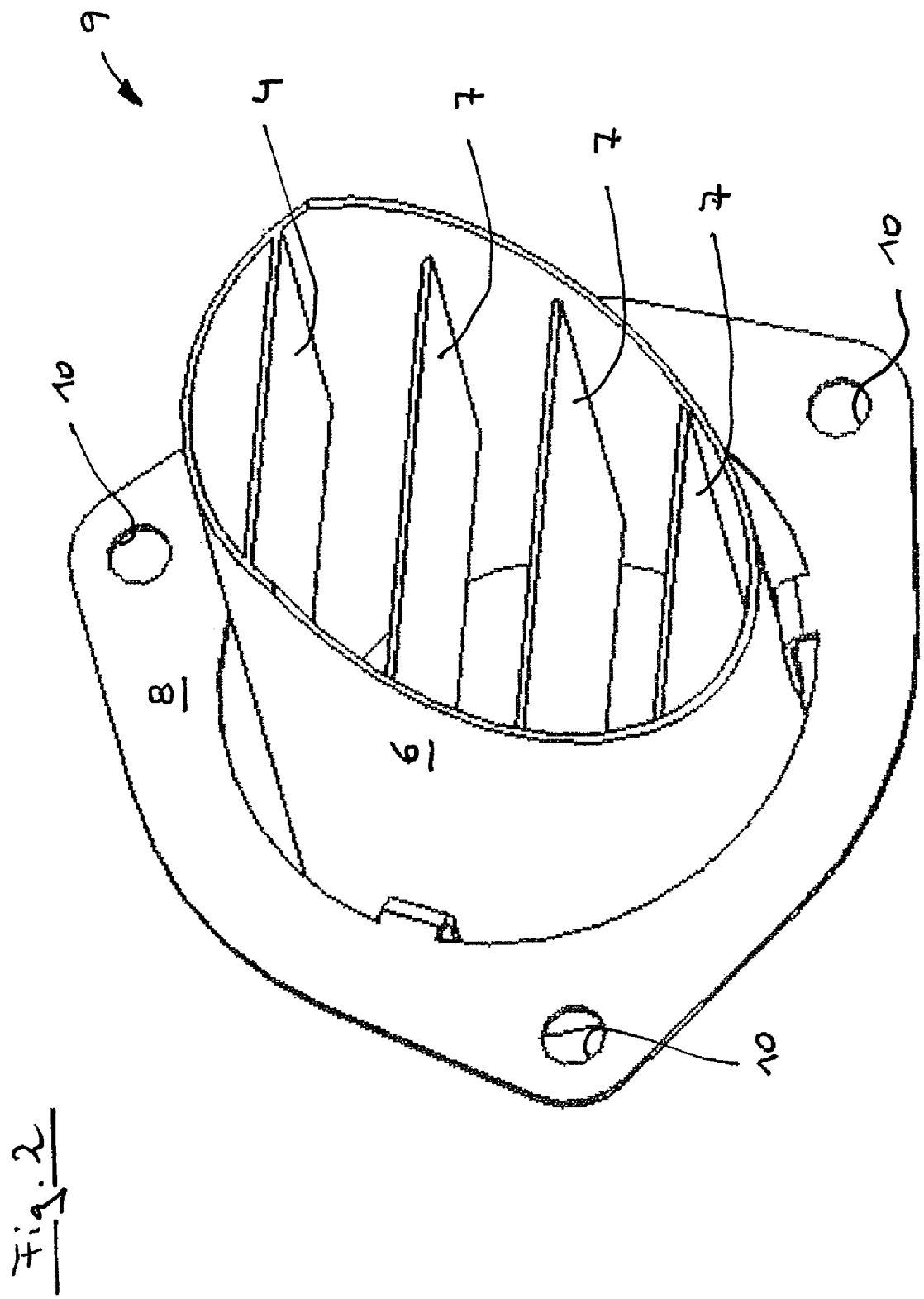

ary_ of the invention. This application claims the priority of German Application No. 10 2006 058 402.3, filed Dec. 12, 2006, the disclosure of which is expressly incorporated by reference herein.

DEVICE FOR ADMIXING A REDUCING AGENT INTO AN EXHAUST GAS FLOW OF AN INTERNAL COMBUSTION ENGINE

BACKGROUND AND SUMMARY OF THE INVENTION

This application claims the priority of German Application No. 10 2006 058 402.3, filed Dec. 12, 2006, the disclosure of which is expressly incorporated by reference herein.

The present invention relates to a device for admixing a reducing agent into an exhaust gas flow of an internal combustion engine.

German published application DE 40 38 054 A1 describes a device for admixing a reducing agent into an exhaust gas flow of an internal combustion engine having an exhaust system and a dosing device for feeding the reducing agent into the exhaust system. Furthermore, the device contains a tripartite vaporizer for vaporizing the reducing agent. The first part, which the exhaust gas flows through, includes a metal honeycomb body, whose ribs may be heated by the exhaust gas. The heated ribs of the metal honeycomb body are situated so as to be oriented in the flow direction of the exhaust gas. An injection device bent by 90° projects into the exhaust system of the internal combustion engine to admix the reducing agent. Reducing agent is added to the exhaust gas by this injection device, which vaporizes on the heated ribs and thus becomes chemically active to eliminate nitrogen oxides in a special nitrogen oxide reduction catalytic converter. A urea-water solution and/or ammonia is preferably used as the reducing agent.

The device described in DE 40 38 054 A1 has the disadvantage of a relatively high flow resistance in the exhaust system, which may only be compensated for by a performance reduction of the internal combustion engine.

The present invention provides a device for admixing a reducing agent into an exhaust gas flow of an internal combustion engine that generates fewer flow losses.

According to the invention, a device is provided for admixing a reducing agent into an exhaust gas flow of an internal combustion engine having an exhaust system, a dosing device for feeding the reducing agent into the exhaust system, and at least one heating rib heatable by the exhaust gas, which is situated downstream from the dosing device in the exhaust system. The heating rib is oriented largely in a flow direction of the exhaust gas. The dosing device is arranged in or on a hollow body arranged on the exhaust system, an internal volume of which is connected to the exhaust system to conduct exhaust gas.

The present invention advantageously provides more favorable flow resistance and thus enhanced performance of the internal combustion engine.

Preferably, the reducing agent may be applied to the heating rib using the dosing device through the hollow body at an angle of approximately 20° and 90°.

In a further preferred embodiment, the heating rib is arranged in a separate pipe, which separate pipe may be situated in the exhaust system. Moreover, at least one further heating rib largely oriented parallel to the first heating rib, may be situated in the separate pipe. This has the advantage of improving the efficiency of the device.

In order to achieve substantially simultaneous vaporization of the heat reducing agent on the heating ribs, in a preferred embodiment the heating ribs are situated such that the reducing agent fed into the exhaust system is largely incident simultaneously on the heating ribs.

By preferably providing the heating ribs with a largely planar surface, the lowest flow losses are obtainable.

In a further preferred embodiment, the heating ribs are provided with a surface structure. In particular, the surface structure may project at most approximately 3 mm out of the planar surface of the heating ribs. This design further improves the efficiency of the device.

In yet another embodiment of the present invention, the separate pipe in which the heating rib is arranged includes a flange for fastening to the exhaust system. This advantageously provides a particularly easy to mount device.

Other objects, advantages and novel features of the present invention will become apparent from the following detailed description of the invention when considered in conjunction with the accompanying drawings.

BRIEF DESCRIPTION OF THE DRAWINGS

FIG. 2 is a top view of a three-dimensionally illustrated vaporization unit.

DETAILED DESCRIPTION OF THE DRAWINGS

Figure 1:
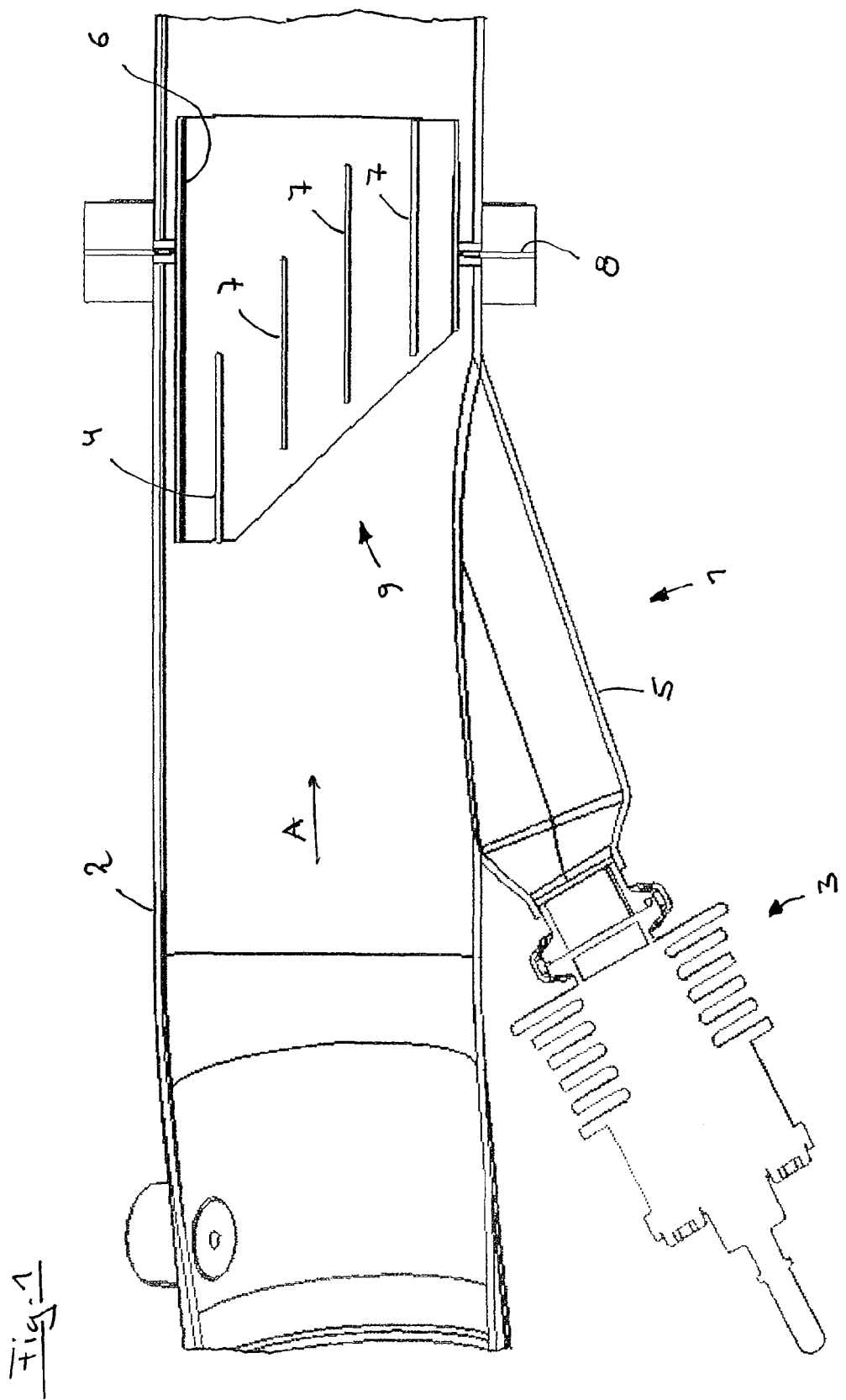
FIG. 1 is a cross-sectional view through a device according to the present invention for admixing a reducing agent into an exhaust gas flow of an internal combustion engine.

Identical reference numerals apply for identical components in FIG. 1 and FIG. 2.

FIG. 1 shows a section through a preferred embodiment of a device 1 for admixing a reducing agent into an exhaust gas flow of an internal combustion engine (not shown) having an exhaust system 2. A vaporization unit 9, which is connectable to the exhaust system 2 via a flange 8, is situated in the exhaust system 2. A flow direction of the exhaust gas is schematically illustrated by an arrow "A" in the exhaust system 2. A hollow body 5 is situated on the exhaust system 2 upstream from the vaporization unit 9, on whose end facing away from the exhaust system 2, a dosing device 3 for the reducing agent is situated. In the present exemplary embodiment, the hollow body 5 and the dosing device 3 are oriented at an angle of approximately 30° to the exhaust gas flow direction. However, in further exemplary embodiments, this angle may also be approximately between 20° and 90°.

The internal volume of the hollow body 5 is connected to the exhaust system 2 to conduct gas, so that reducing agent sprayed into the hollow body 5 may penetrate into the exhaust system 2 and be atomized and vaporized on the vaporization unit 9. In the simplest case, the vaporization unit 9 has a single heating rib 4 in a pipe 6 situated coaxially to the exhaust system 2, the heating rib 4 being oriented largely in the flow direction of the exhaust gas in order to minimize the flow resistance. In the present, especially preferred exemplary embodiment, the vaporization unit 9 has the heating rib 4 and three further heating ribs 7, which are situated parallel to one another in the pipe 6. The ribs in the FIG. 1 embodiment are thin plates, having substantially no cross-sectional area and at least two broad plate surfaces aligned parallel to the exhaust gas flow direction so as to minimize resistance to the exhaust gas flow.

The further heating ribs 7 are also oriented largely in the flow direction of the exhaust gas to minimize the flow resistance and are heated by the hot exhaust gas during operation of the internal combustion engine. Furthermore, the heating ribs 4, 7 are situated in relation to the dosing device 3 such that the reducing agent sprayed into the exhaust system is largely incident simultaneously on the heating ribs 4, 7. Ideally, the heating ribs 4, 7 are planar shaped. To further improve the efficiency of the vaporization unit 9, the heating ribs 4, 7 may also have a surface structure, the surface structure projecting at most 3 mm out of the planar surface. However, a greater flow resistance for the exhaust gas will thus disadvantageously result. For the simplest possible mounting of the vaporization unit 9 in the exhaust system 2, the vaporization unit 9 has a flange 8 situated on its radial exterior.

FIG. 2 shows the top view of a three-dimensionally illustrated vaporization unit 9 having a heating rib 4 and three further heating ribs 7. As already described with respect to FIG. 1, the vaporization unit 9 has the flange 8 on its radial exterior, which is oriented largely perpendicularly to the flow direction of the exhaust gas in the exhaust system 2. For mounting the vaporization unit 9 in the exhaust system 2, the flange 8 has three mounting holes 10.

The vaporization unit 9 and the flange 8 are preferably manufactured from a steel sheet, but other high-temperature-resistant materials, such as ceramics, may also be used. The flange 8 is, in turn, situated via small flanges (not numbered) on the pipe 6, in which the heating ribs 4, 7 are situated in turn. Therefore, the vaporization unit 9 is a compact independent assembly, which may also be later retrofitted into in exhaust systems 2.

The hollow body 5 preferably has an external radius which corresponds at most to the external radius of the exhaust system 2. Depending on the construction embodiment of the dosing device 3, the coupling of the dosing device 3 to the hollow body 5 may vary. In the present exemplary embodiment, the hollow body 5 is conically shaped, in other exemplary embodiments it may also be tubular shaped, however. The hollow body 5 is preferably manufactured from the same material, such as stainless steel, as the exhaust system 2.

An extremely low flow resistance is achieved simultaneously with very good efficiency by the design according to the present invention of the device for admixing a reducing agent into an exhaust gas flow of an internal combustion engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for admixing a reducing agent into an exhaust gas flow of an internal combustion engine having an exhaust system, the device comprising:
    a dosing device for feeding the reducing agent into the exhaust system;
    a hollow body operatively arranged on the exhaust system and having an internal volume coupled to the exhaust system in order to conduct exhaust gas, the dosing device being operatively configured in or on the hollow body;
    at least one heating rib heatable by the exhaust gas, the at least one heating rib being operatively configured downstream from the dosing device in the exhaust system and being substantially oriented such that a longitudinal axis thereof extends in a flow direction of the exhaust gas; and
    at least one additional heating rib oriented largely parallel to the one heating rib,
    wherein the at least one heating rib and the at least one additional heating rib are thin plates, each plate having substantially no cross-sectional area and at least two broad plate surfaces aligned parallel to the exhaust gas flow direction so as to minimize resistance to the exhaust gas flow.

2. The device according to claim 1, wherein the dosing device and the hollow body are operatively configured such that the reducing agent is applyable to the at least one heating rib at an angle substantially between 20° and 90°.

3. The device according to claim 1, further comprising a separate pipe operatively arranged in the exhaust system, the at least one heating rib being situated in the separate pipe.

4. The device according to claim 2, further comprising a separate pipe operatively arranged in the exhaust system, the at least one heating rib being situated in the separate pipe.

5. The device according to claim 3, wherein the at least one heating rib and the at least one additional heating rib are operatively arranged such that the reducing agent fed into the exhaust system is largely incident simultaneously on the heating ribs.

6. The device according to claim 1, wherein the at least one heating rib comprises a surface structure.

7. The device according to claim 2, wherein the at least one heating rib comprises a surface structure.

8. The device according to claim 6, wherein the surface structure projects substantially 3 mm or less out of a planar surface of the heating rib.

9. The device according to claim 7, wherein the surface structure projects substantially 3 mm or less out of a planar surface of the heating rib.

10. The device according to claim 3, wherein the separate pipe comprises a flange adapted for fastening the pipe to the exhaust system.

* * * * *